United States Patent
Chen et al.

[11] Patent Number: 6,061,473
[45] Date of Patent: May 9, 2000

[54] COMPRESSION AND EXPANSION METHODS AND APPARATUS

[75] Inventors: Liming Chen; Osamu Asada, both of Tokyo, Japan

[73] Assignee: Oki Data Corporation, Tokyo, Japan

[21] Appl. No.: 08/844,528

[22] Filed: Apr. 18, 1997

[30] Foreign Application Priority Data

May 17, 1996 [JP] Japan .................................... 8-148403

[51] Int. Cl.⁷ .................................................. G06K 9/36
[52] U.S. Cl. .......................................... 382/235; 382/244
[58] Field of Search .................................. 382/235, 237, 382/239, 244; 358/261.2, 426, 429, 430, 433, 459, 404, 436, 435, 438; 395/115; 345/203

[56] References Cited

U.S. PATENT DOCUMENTS

| | | | |
|---|---|---|---|
| 4,853,778 | 8/1989 | Tanaka | 358/426 |
| 5,040,233 | 8/1991 | Davy et al. | 382/239 |
| 5,107,345 | 4/1992 | Lee | 382/239 |
| 5,177,797 | 1/1993 | Takenaka et al. | 358/426 |
| 5,513,279 | 4/1996 | Yoshinari et al. | 358/426 |
| 5,553,160 | 9/1996 | Dawson | 382/239 |
| 5,555,323 | 9/1996 | Hongu | 382/239 |
| 5,696,842 | 12/1997 | Shirasawa et al. | 382/239 |
| 5,699,169 | 12/1997 | Nakatani et al. | 358/426 |
| 5,715,329 | 2/1998 | Murata | 358/426 |
| 5,832,126 | 11/1998 | Tanaka | 382/239 |

*Primary Examiner*—Yon J. Couso
*Attorney, Agent, or Firm*—Akin, Gump, Strauss, Hauer & Feld, L.L.P.

[57] ABSTRACT

A compression and encoding system for bi-level image data determines the available memory capacity of a receiving device, then compresses and encodes the image data with successively increasing compression ratios until encoded data not exceeding the memory capacity of the receiving device are obtained. Preferably, the image is divided into rectangular blocks, and successive bit planes are generated on the basis of the number of dark picture elements in each block, and on the basis of adjacency relationships among like-valued picture elements in each block. Feedback may be employed to adjust the darkness of certain compressed blocks according to the darkness of the preceding block.

28 Claims, 15 Drawing Sheets

FIG. 7
| GROUP | | | | |
|---|---|---|---|---|
| 1 | 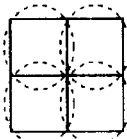 NO.0 | | | |
| 2 | 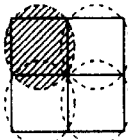 NO.1 | 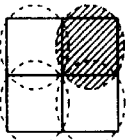 NO.2 | 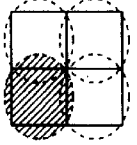 NO.3 | 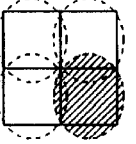 NO.4 |
| 3 | 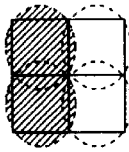 NO.5 | 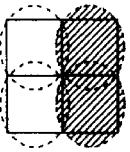 NO.6 | | |
| 4 | 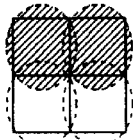 NO.7 | 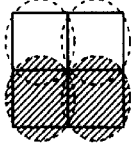 NO.8 | | |
| 5 | 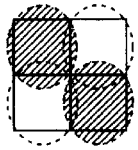 NO.9 | 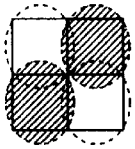 NO.10 | | |
| 6 | 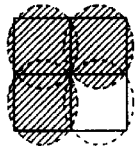 NO.11 | 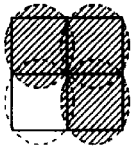 NO.12 | 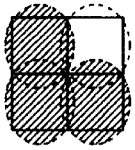 NO.13 | 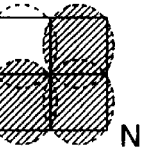 NO.14 |
| 7 | 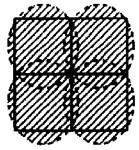 NO.15 | | | |

FIG. 8

| No. | DATA |
|---|---|
| 0 | 0 0 0 0 |
| 1 | 1 0 0 0 |
| 2 | 0 1 0 0 |
| 3 | 0 0 1 0 |
| 4 | 0 0 0 1 |
| 5 | 1 0 1 0 |
| 6 | 0 1 0 1 |
| 7 | 1 1 0 0 |
| 8 | 0 0 1 1 |
| 9 | 1 0 0 1 |
| 1 0 | 0 1 1 0 |
| 1 1 | 1 1 1 0 |
| 1 2 | 1 1 0 1 |
| 1 3 | 1 0 1 1 |
| 1 4 | 0 1 1 1 |
| 1 5 | 1 1 1 1 |

FIG. 9

| DATA | PATTERN |
|---|---|
| 0 0 0 0 | 0 0 |
| 1 0 0 0<br>0 1 0 0<br>0 0 1 0<br>0 0 0 1 | 0 1 |
| 1 0 1 0<br>0 1 0 1 | 1 0 0 |
| 1 1 0 0<br>0 0 1 1 | 1 0 1 |
| 1 0 0 1<br>0 1 1 0 | 1 1 0 |
| 1 1 1 0<br>1 1 0 1<br>1 0 1 1<br>0 1 1 1<br>1 1 1 1 | 1 1 1 |

FIG. 14

| DATA | PATTERN |
|------|---------|
| 0 0 0 0 | 0 0 0 0 |
| 1 0 0 0 | 0 1 0 0 |
| 0 1 0 0 | 0 1 0 1 |
| 0 0 1 0 | 0 1 1 0 |
| 0 0 0 1 | 0 1 1 1 |
| 1 0 1 0 | 1 0 0 0 |
| 0 1 0 1 | 1 0 0 1 |
| 1 1 0 0 | 1 0 1 0 |
| 0 0 1 1 | 1 0 1 1 |
| 1 0 0 1 | 1 1 0 0 |
| 0 1 1 0 | 1 1 0 1 |
| 0 1 1 1 | 1 1 1 0 |
| 1 0 1 1 | |
| 1 1 0 1 | |
| 1 1 1 0 | |
| 1 1 1 1 | 1 1 1 1 |

FIG. 15

| DATA | PATTERN |
|------|---------|
| 0 0 0 0 | 0 0 0 0 |
| 1 0 0 0 | 0 1 0 0 |
| 0 1 0 0 | 0 1 0 1 |
| 0 0 1 0 | 0 1 1 0 |
| 0 0 0 1 | 0 1 1 1 |
| 1 0 1 0 | 1 0 0 0 |
| 0 1 0 1 | |
| 1 1 0 0 | 1 0 0 1 |
| 0 0 1 1 | |
| 1 0 0 1 | 1 0 1 0 |
| 0 1 1 0 | 1 0 1 1 |
| 0 1 1 1 | 1 1 0 0 |
| 1 0 1 1 | 1 1 0 1 |
| 1 1 0 1 | 1 1 1 0 |
| 1 1 1 0 | 1 1 1 1 |
| 1 1 1 1 | |

FIG. 17

| FEEDBACK | DATA | PATTERN |
|---|---|---|
| | | |
| 1 | 1 0 0 0 | 1 0 0 0 |
| | 0 1 0 0 | 1 0 0 1 |
| | 0 0 1 0 | 1 0 1 0 |
| | 0 0 0 1 | 1 0 1 1 |
| 0 | 1 0 0 0 | 0 1 0 0 |
| | 0 1 0 0 | 0 1 0 1 |
| | 0 0 1 0 | 0 1 1 0 |
| | 0 0 0 1 | 0 1 1 1 |
| | | |

COMPRESSION AND EXPANSION METHODS AND APPARATUS

BACKGROUND OF THE INVENTION

The present invention relates to methods and apparatus for compressing and expanding bi-level image data, more particularly to methods and apparatus that avoid unnecessary loss of resolution when the image data must be compressed to within a fixed size.

When a bi-level image stored in a computer is printed by a printer, for example, the amount of image data that must be transferred from the computer to the printer is extremely large, so the data are often compressed in the computer, transferred in compressed form, then expanded in the printer. Before being expanded, the data must be temporarily stored in a memory in the printer. Although it is desirable for the printer's memory to be as large as possible, space and cost restrictions normally limit the amount of memory with which a printer can be provided, thus forcing the computer to compress the image data to a size not exceeding a certain limited memory capacity.

To complicate matters, some bi-level images are much harder to compress than others. Images of pages of text are comparatively easy to compress, and can usually be compressed satisfactorily by lossless compression methods. Natural images such as bi-level images generated from photographs, and especially images in which different shades of gray are represented by dot patterns generated using a dithering matrix, are much harder to compress; lossy compression methods must be often employed if adequate compression ratios are to be achieved.

Although lossy compression methods can produce arbitrarily high compression ratios, there is a corresponding loss of resolution when the data are expanded. This effect can be seen, for example, in data compressed according to the progressive reduction standard (PRES) recommended by the Joint Bi-Level Image Coding Experts Group (JBIG). According to this standard, a series of images is created by successively reducing the resolution of a bi-level image, and differential images are produced by taking the differences between successive images in the series. First the most reduced image is encoded and transmitted; then the differential images are successively encoded and transmitted. When the most reduced image is received, decoded, and expanded, the result is an extremely blocky or grainy image showing no fine detail, but as more data are received, the image resolution improves dramatically.

When this method is applied to the transfer of bi-level image data to a printer with a comparatively small memory, however, it may be impossible to transfer more than the most reduced image, resulting in illegible text pages, natural images with a blocky, grainy, or washed-out appearance, and other unacceptable printed output.

SUMMARY OF THE INVENTION

It is accordingly an object of the present invention to compress bi-level image data for transmission to a device having a limited memory capacity, without unnecessary loss of resolution.

A further object is to avoid the loss of isolated dots when an image is compressed and expanded.

The invention compression and coding method begins by determining the memory capacity of the device that will receive the transmitted data. The bi-level image data are then losslessly encoded, and the size of the resulting encoded data is compared with the memory capacity of the receiving device. If the size of the encoded data does not exceed the memory capacity of the receiving device, the encoded data are transmitted to the receiving device.

If the size of the encoded data exceeds the memory capacity of the receiving device, the bi-level image data are compressed with a certain compression ratio to obtain compressed data, and the compressed data are losslessly encoded. The size of the resulting encoded data is again compared with the memory capacity of the receiving device, and the encoded data are transmitted to the receiving device if the size of the encoded data does not exceed the memory capacity of the receiving device.

If the size of the encoded data still exceeds the memory capacity of the receiving device, the above process is repeated with successively increasing compression ratios until encoded data not exceeding the memory capacity of the receiving device are obtained. Preferably, compressed data with different compression ratios are produced concurrently and stored in memories, lossless encoding being carried out on the data stored in different memories in turn until encoded data not exceeding the memory capacity of the receiving device are obtained.

A preferred method of compressing the bi-level image data to obtain successively increasing compression ratios arranges the bi-level image data into blocks, each block having a fixed number of bits and representing a rectangular image area. Bits having a certain value are counted to determine the weight of each block, and adjacency relationships among like-valued bits in the rectangular image area represented by each block are detected. For each block, at least one bit with a value responsive to the weight of the block is generated, and for blocks having a certain weight, at least one subsequent bit with a value responsive to the adjacency relationships is generated. The generated bits constitute the compressed data. The compression ratio is increased by discarding generated bits. The highest compression ratio is achieved by discarding all but one bit per block, this bit having a value responsive to the weight of the block.

In a modification of this preferred method, feedback from one block to the next is used to adjust the weight of each block, responsive to the weight of the preceding block.

When data arranged into blocks and compressed as above are expanded, a number of bits are produced for each block, the number being determined by the compression ratio. When printed, bits produced from the same block are preferably aligned in a single direction, enabling the resolution of the printed image to be varied without requiring control of the resolution in more than one direction.

The invented bi-level image data compression and coding apparatus has a memory checker for determining the memory capacity of the device that will receive the compressed and encoded data.

The invented decoding and expanding apparatus receives compressively coded bi-level image data and information specifying a compression ratio. The apparatus has a plurality of data expanders for expanding the decoded data with different expansion ratios, and a selector for selecting the expanded bi-level image data generated by one of the data expanders, according to the compression ratio.

BRIEF DESCRIPTION OF THE DRAWINGS

In the attached drawings:

FIG. 7 illustrates different two-by-two blocks of pixels;

FIG. 8 illustrates these blocks represented as binary data;

FIG. 9 illustrates the data compression scheme of the third embodiment;

FIG. 14 illustrates the data compression scheme of a fifth embodiment of the invention;

FIG. 15 illustrates the data compression scheme of a sixth embodiment of the invention;

FIG. 17 illustrates a feedback scheme employed in the seventh embodiment;

DETAILED DESCRIPTION OF THE INVENTION

Embodiments of the invention will be described with reference to the attached illustrative drawings.

Figure 1:
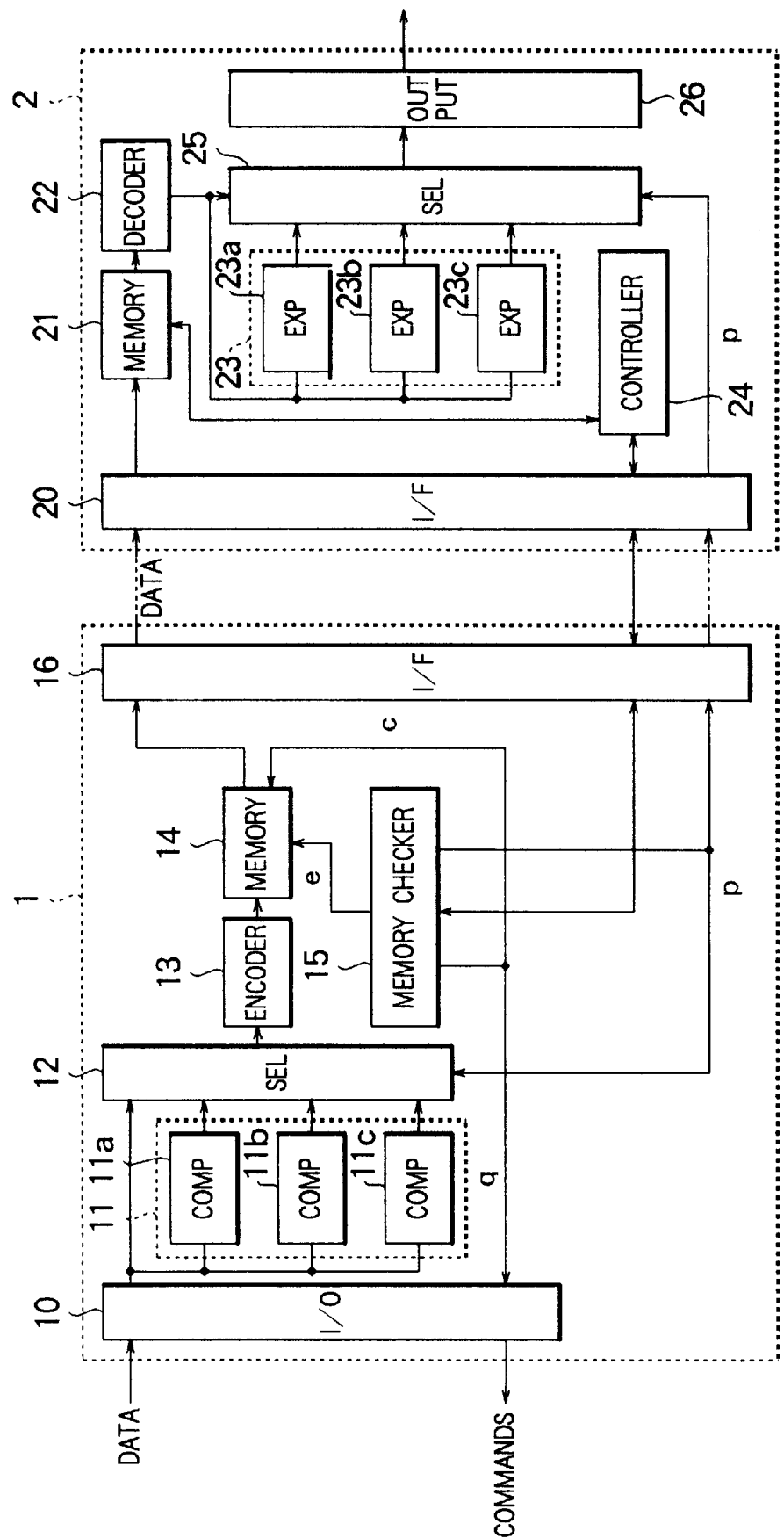
FIG. 1 is a block diagram of a first embodiment of the invention.

The first embodiment, shown in FIG. 1, illustrates the general plane of the invented compression and encoding apparatus 1 and decoding and expanding apparatus 2.

The compression and encoding apparatus 1 has an input-output unit 10 that sends commands to a host device such as the central processing unit of a computer (not shown) in which the compression and encoding apparatus 1 is disposed. The input-output unit 10 also receives bi-level image data, and provides the bi-level image data to a data compression unit 11 and a selector 12. The data compression unit 11 has three separate data compressors 11a, 11b, and 11c, which compress the bi-level image data with different compression ratios. The selector 12 selects either the bi-level image data received from the input-output unit 10 or the compressed data generated by one of the data compressors 11a, 11b, and 11c, responsive to a control signal denoted in the drawings by the letter 'p.'

The control signal 'p' is, for example, a two-bit signal in which the value '00' causes the selector 12 to select the bi-level image data received from the input-output unit 10, the value '01' causes the selector 12 to select the compressed data generated by data compressor 11a, the value '10' causes the selector 12 to select the compressed data generated by data compressor 11b, and the value '11' causes the selector 12 to select the compressed data generated by data compressor 11c.

A lossless coder 13 receives and losslessly encodes the data selected by the selector 12. Well-known lossless encoding methods such as run-length encoding and entropy encoding may be employed. The encoded data are stored in an encoded data memory 14.

A memory checker 15 compares the size of the encoded data stored in the encoded data memory 14 with the memory capacity of the decoding and expanding apparatus 2, and generates the control signal 'p'. The memory checker 15 learns this memory capacity by communicating with the decoding and expanding apparatus 2 through an interface unit 16. The memory checker 15 also sends commands, such as a data-requesting command 'q,' to the host device through the input-output unit 10, sends a clearing signal 'c' to the encoded data memory 14, and sends the encoded data memory 14 an output signal 'e' that causes the encoded data memory 14 to output the stored encoded data through the interface unit 16 to the decoding and expanding apparatus 2.

The interface unit 16 sends the decoding and expanding apparatus 2 not only the encoded data output from the encoded data memory 14, but also the control signal 'p' output by the memory checker 15.

In the decoding and expanding apparatus 2, an interface unit 20 receives the encoded data and the control signal 'p' from the interface unit 16. The two interface units 16 and 20 are interconnected by well-known means such as an electrical cable or optical data link, not explicitly shown in the drawings.

The encoded data received by the interface unit 20 are stored in a receiving memory 21, then supplied to an decoded by a lossless decoder 22. The resulting decoded data are furnished to a data expansion unit 23 having three data expanders 23a, 23b, and 23c, and to a selector 25. The selector 25 selects either the decoded data obtained from the lossless decoder 22 or expanded data obtained from one of the data expanders 23a, 23b, and 23c, according to the control signal 'p' received by the interface unit 20. The data expanders 23a, 23b, and 23c are adapted for correct expansion of data compressed by the data compressors 11a, 11b, and 11c, respectively.

The data selected by the selector 25 are supplied to an output unit 26, which sends the selected data to, for example, the printing engine or printing head of an electrophotographic printer in which the decoding and expanding apparatus 2 is disposed. The printing head or other device that receives data from the output unit 26 is not visible in the drawings.

A controller 24 controls the overall operation of the decoding and expanding apparatus 2 and communicates with the compression and encoding apparatus 1 through the interface unit 20. In particular, the controller 24 informs the memory checker 15 of the available memory capacity of the receiving memory 21. The available memory capacity is not necessarily constant, because the receiving memory 21 may be part of a larger memory unit that is used for various purposes.

The encoded data memory 14 and receiving memory 21 comprise semiconductor memory devices such as dynamic random-access memory (DRAM) devices. The interface units 16 and 20 comprise well-known electronic or opto-electronic devices for transmitting and receiving signals. The other elements shown in FIG. 1 comprise logic circuits, suitably programmed computing devices, or the like; detailed descriptions will be omitted to avoid obscuring the invention with irrelevant detail.

Next the operation of the first embodiment will be described, starting with the compression and encoding operations.

Figure 2:
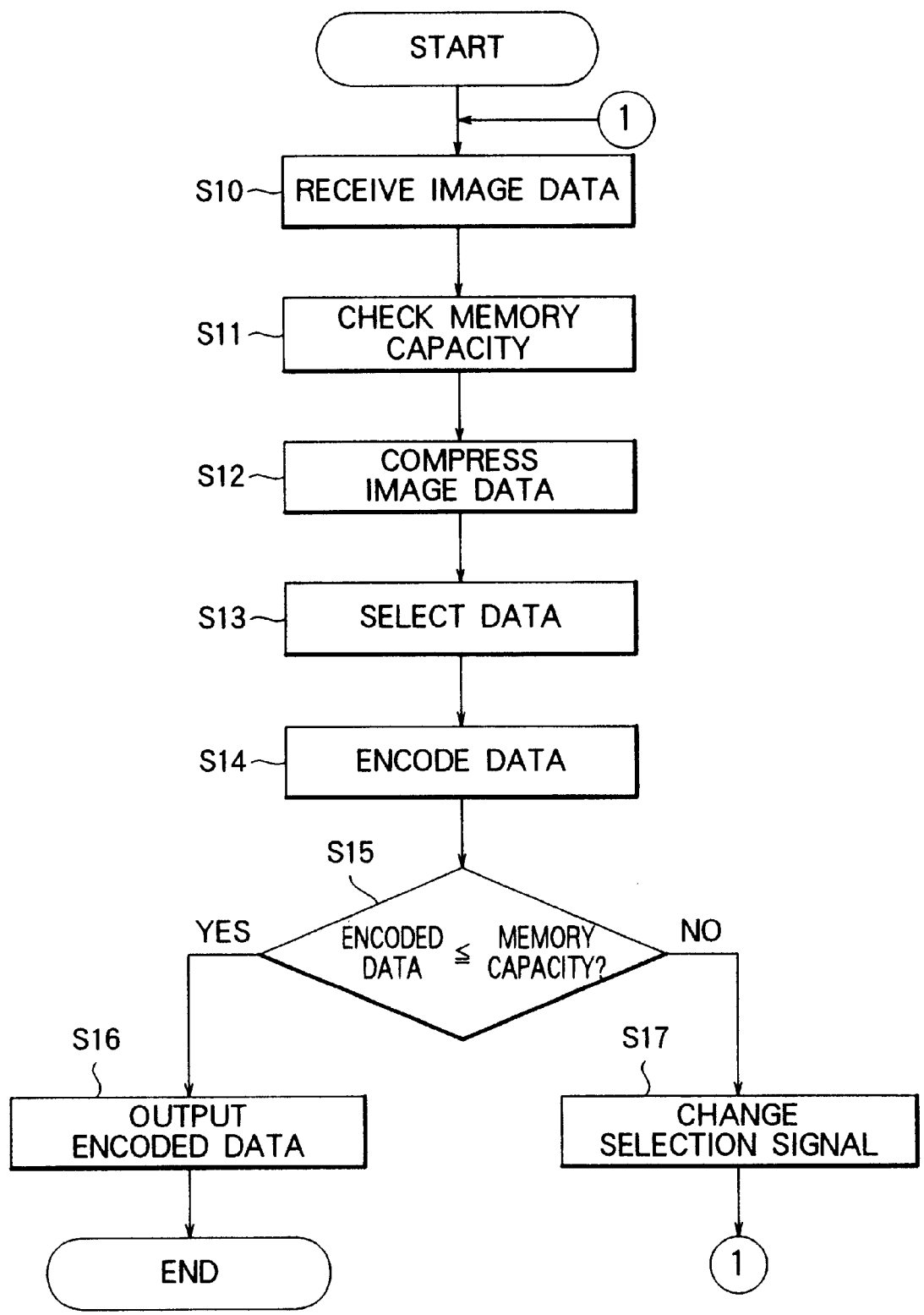
FIG. 2 is a flowchart illustrating the operation of the data compression and coding apparatus in the first embodiment.

Referring to the flowchart in FIG. 2, in step S10 the memory checker 15 sends a data-requesting command 'q' to the host device, and the host device responds by sending bi-level image data to the input-output unit 10. The memory checker 15 simultaneously sends a clearing signal 'c' to the encoded data memory 14, and sets the control signal 'p' to a value (e.g. '00') that causes the selector 12 to select the data received from the input-output unit 10.

In step S11, the memory checker 15 also queries the controller 24. The controller 24 responds by reporting the available memory capacity of the receiving memory 21. The memory checker 15 stores the reported memory capacity value internally.

In step S12, the three data compressors 11a, 11b, and 11c compress the bi-level image data at three different compression ratios concurrently. For example, data compressor 11a compresses the bi-level image data with a compression ratio of 4:3, data compressor 11b concurrently compresses the bi-level image data with a compression ratio of 4:2, and data compressor 11c concurrently compresses the bi-level image data with a compression ratio of 4:1. Specific method of data compression will be described in later embodiments.

In step S13, the selector 12 selects data according to the control signal 'p'. Initially, the selector 12 selects the uncompressed data received from the input-output unit 10. In step S14 the lossless coder 13 losslessly encodes the selected data. The lossless encoding process may also compress the data.

In step S15, by comparing the size of the resulting encoded data with the previously-stored memory capacity value, the memory checker 15 determines whether the size of the encoded data exceeds the memory capacity of the receiving memory 21 in the decoding and expanding apparatus 2. In step S16, if the size of the encoded data does not exceed the memory capacity of the receiving memory 21, the memory checker 15 sends an output signal 'e' to the encoded data memory 14, and the encoded data are transferred through the interface units 16 and 20 to the receiving memory 21.

In step S17, if the size of the encoded data exceeds the memory capacity of the receiving memory 21, the memory checker 15 changes the control signal 'p' to a value (e.g. '01') causing the selector 12 to select the output of data compressor 11a, then repeats all of the preceding steps. Specifically, the memory checker 15 sends another clearing signal 'c' to the encoded data memory 14, and another data-requesting signal 'q' to the host device. The host device sends the same bi-level image data again, and the same compression and encoding process is repeated, except that this time, in step S13, the selector 12 selects the compressed data generated by data compressor 11a. Once more, the memory checker 15 compares the size of the resulting encoded data with the memory capacity of the receiving memory 21, and sends an output signal 'e' to the encoded data memory 14 if the encoded data size does not exceed the memory capacity of the receiving memory 21.

If, despite compression, the size of the encoded data exceeds the memory capacity of the receiving memory 21, the memory checker 15 changes the control signal 'p' to a value (e.g. '10') causing the selector 12 to select the output of data compressor 11b, then sends yet another memory clearing signal 'c' to the encoded data memory 14 and yet another data-requesting signal 'q' to the host device. The same compression and encoding process is repeated again, using the compressed data generated by data compressor 11b. If the resulting encoded data do not exceed the memory capacity of the receiving memory 21, they are transferred through the interface units 16 and 20 to the receiving memory 21.

If the encoded data still exceed the memory capacity of the receiving memory 21, the above process is repeated once again, with the control signal 'p' set to a value (e.g. '11') causing the selector 12 to select the compressed data generated by data compressor 11c. If the resulting encoded data do not exceed the memory capacity of the receiving memory 21, they are transferred through the interface units 16 and 20 to the receiving memory 21. If the encoded data size still exceeds the memory capacity of the receiving memory 21, the memory checker 15 notifies the host device that the bi-level image data cannot be sent to the decoding and expanding apparatus 2.

Next, the operation of the decoding and expanding apparatus 2 will be described.

Figure 3:
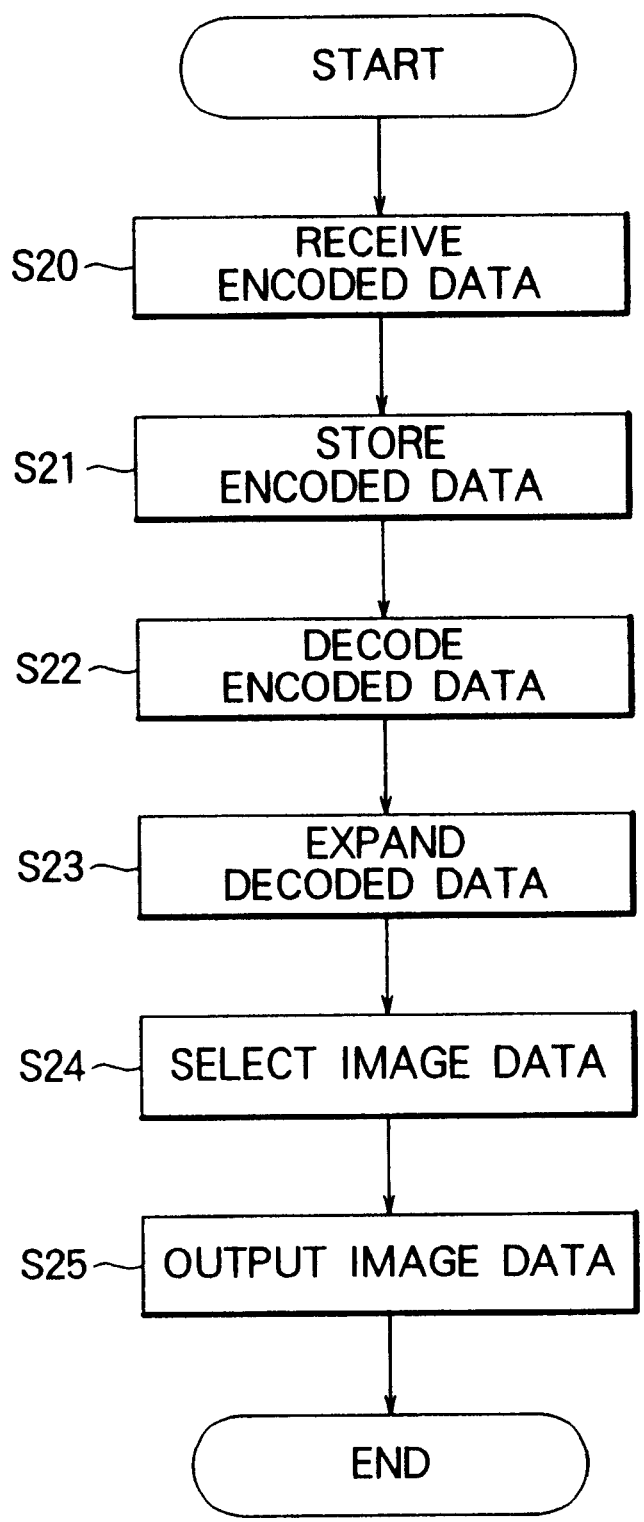
FIG. 3 is a flowchart illustrating the operation of the data expansion and decoding apparatus in the first embodiment.

Referring to FIG. 3, the interface unit 20 receives the encoded data sent by the interface unit 16 in step S20, and stores the received data in the receiving memory 21 in step S21. The lossless decoder 22 decodes the stored encoded data in step S22, and the data expanders 23a, 23b, and 23c expand the decoded data in step S23. In step S24, the selector 25 selects the decoded data output by the lossless decoder 22 or the expanded data output by one of the data expanders 23a, 23b, and 23c, according to the control signal 'p' received by the interface unit 20. In step S25, the output unit 26 outputs the selected data to be printed or otherwise processed. If the control signal 'p' has the values mentioned above, then a value of '00' causes the selector 25 to select the decoded data output by the lossless decoder 22, a value of '01' causes the selector 25 to select the decoded data output by data expander 23a, a value of '10' causes the selector 25 to select the decoded data output by data expander 23b, and a value of '11' causes the selector 25 to select the decoded data output by data expander 23c.

Since the data compressors 11a, 11b, and 11c compress the bi-level image data with successively increasing compression ratios, each time the memory checker 15 changes the value of the control signal 'p,' the lossless coder 13 receives fewer data than the time before. The size of the resulting encoded data accordingly becomes progressively smaller. The compression ratio of data compressor 11c is preferably high enough to ensure compliance with the memory capacity of the receiving memory 21.

The compression and encoding apparatus 1 uses the least amount of compression necessary to fit the encoded data into the receiving memory 21. If the bi-level image data represent a page of text, for example, then lossless encoding by itself can achieve a high degree of compression, and in many cases it will not be necessary to use the output of the data compression unit 11. The output of the lossless decoder 22 in the decoding and expanding apparatus 2 will then be identical to the bi-level image data received by the input-output unit 10 in the compression and encoding apparatus 1, so the data can be printed without any loss of resolution at all.

When natural image data produced by means of a dithering matrix are compressed and encoded, it may be necessary to use the output of one of the data compressors 11a, 11b, and 11c to obtain sufficiently small encoded data, in which case the decoded data output by the lossless decoder 22 will have to be expanded by the corresponding data expander 23a, 23b, or 23c, with an attendant loss of resolution. The loss of resolution is minimized, however, because the compression and encoding apparatus 1 selects the least necessary compression ratio. The decoding and expanding apparatus 2 can therefore produce satisfactory output for a wide range of images.

Next, a second embodiment of the invention will be described.

Figure 4:
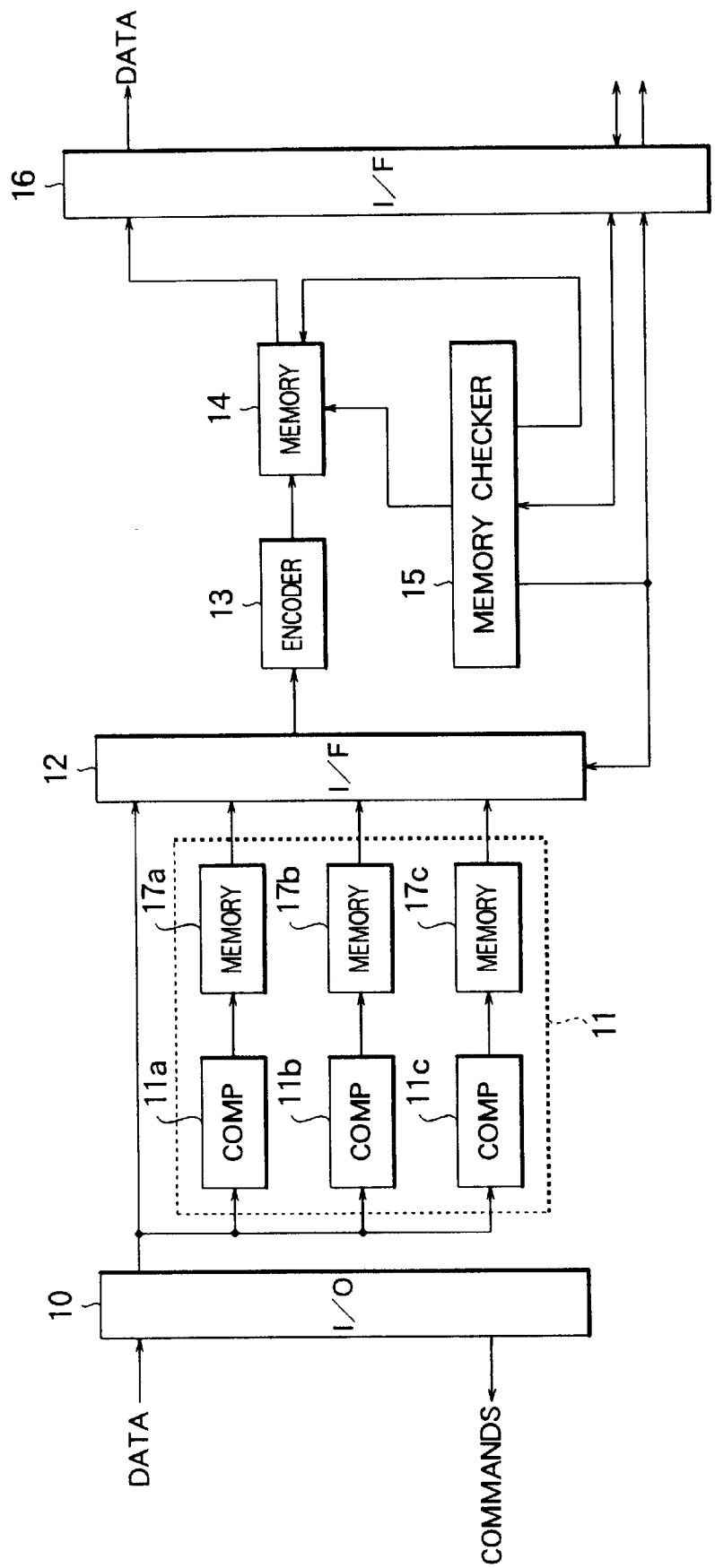
FIG. 4 is a block diagram of the data compression and coding apparatus in a second embodiment of the invention.

Referring to FIG. 4, the second embodiment is a compression and encoding apparatus 1 which is identical to the compression and encoding apparatus 1 in the first embodiment, but with the addition of three compressed data memories 17a, 17b, and 17c that store the compressed data generated by the data compressors 11a, 11b, and 11c in the data compression unit 11. The compressed data memories 17a, 17b, and 17c comprise one or more semiconductor memory devices such as DRAM devices. The selector 12 obtains compressed data from the compressed data memories 17a, 17b, and 17c, instead of obtaining the data directly from the data compressors 11a, 11b, and 11c.

Figure 5:
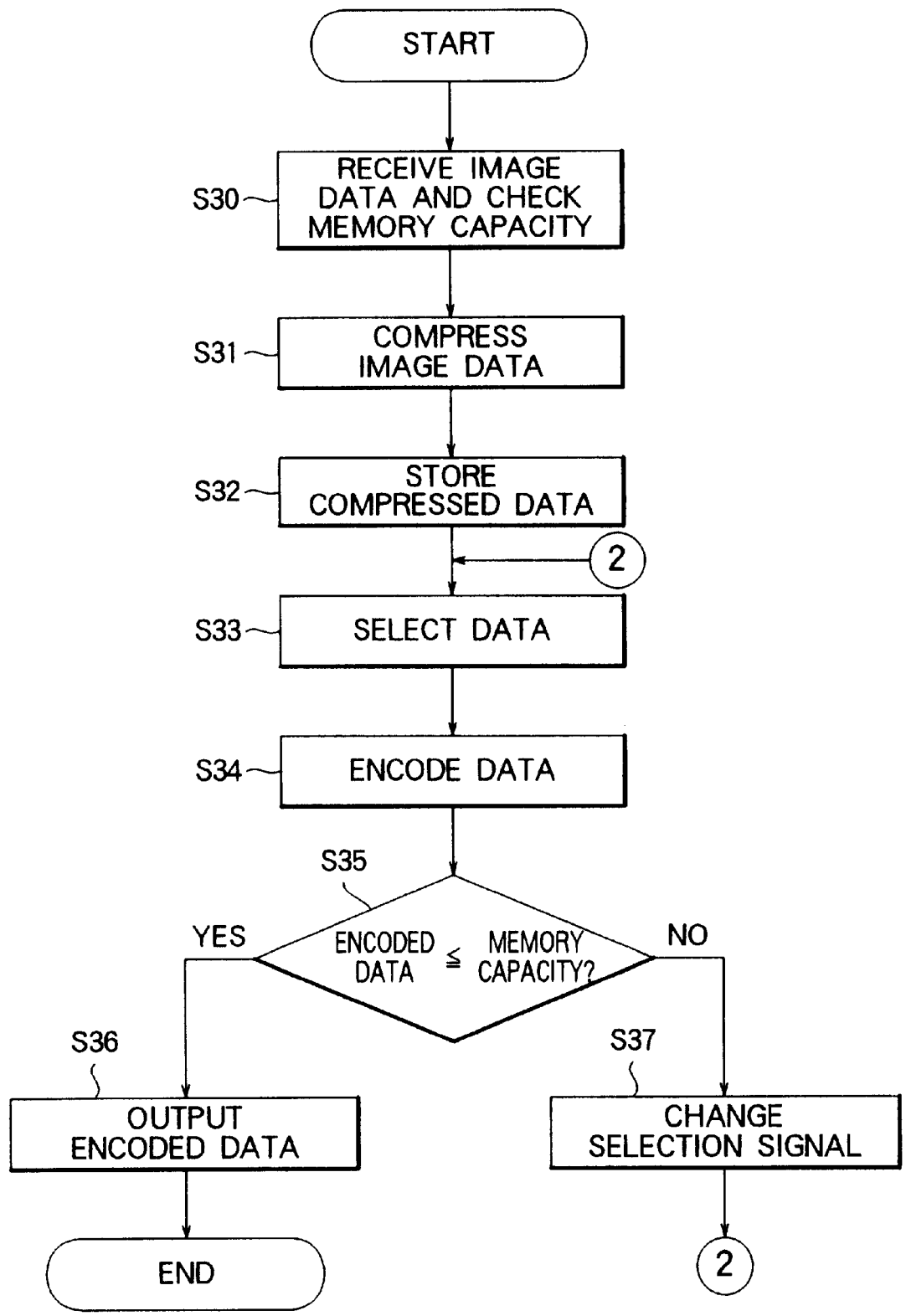
FIG. 5 is a flowchart illustrating the operation of the second embodiment.

The second embodiment operates as shown in FIG. 5. In step S30, the input-output unit 10 receives the bi-level image data and the memory checker 15 checks the available memory capacity of the decoding and expanding apparatus 2 that will receive the encoded data. This step is equivalent to steps S10 and S11 in FIG. 2. In step S31, the data compressors 11a, 11b, and 11c concurrently compress the received data at three different compression ratios. In step S32, the compressed data are stored in respective compressed data memories 17a, 17b, and 17c.

In step S33, the selector 12 selects either the received bi-level image data or the compressed data stored in one of the three compressed data memories 17a, 17b, and 17c, according to the control signal 'p' output by the memory checker 15. In step S34, the lossless coder 13 encodes the selected data. In step S35, the memory checker 15 determines whether the size of the encoded data exceeds the available memory capacity. If the encoded data size does not exceed the available memory capacity, the encoded data are output from the encoded data memory 14 through the interface unit 16 in step S36.

If the size of the encoded data exceeds the available memory capacity, the memory checker 15 changes the selection signal 'p' in step S37 to select the next higher compression ratio, as in the first embodiment. The operation then returns to step S33: the selector 12 selects the compressed data now indicated by the control signal 'p', and the selected data are again encoded. The operation loops through steps S33, S34, S35, and S37 until encoded data not exceeding the available memory capacity are obtained.

The difference between the first and second embodiments is that in the second embodiment, the host device has to send the bi-level image data to the compression and encoding apparatus only once, no matter how many times the data have to be encoded before encoded data not exceeding the available memory capacity are obtained. This enables the second embodiment to operate with a higher average throughput rate than the first embodiment, and reduces the input-output load on the host device.

Next a third embodiment will be described. The third embodiment is a data compression unit 11 that compresses bi-level image data with different compression ratios as required by the first two embodiments.

Figure 6:
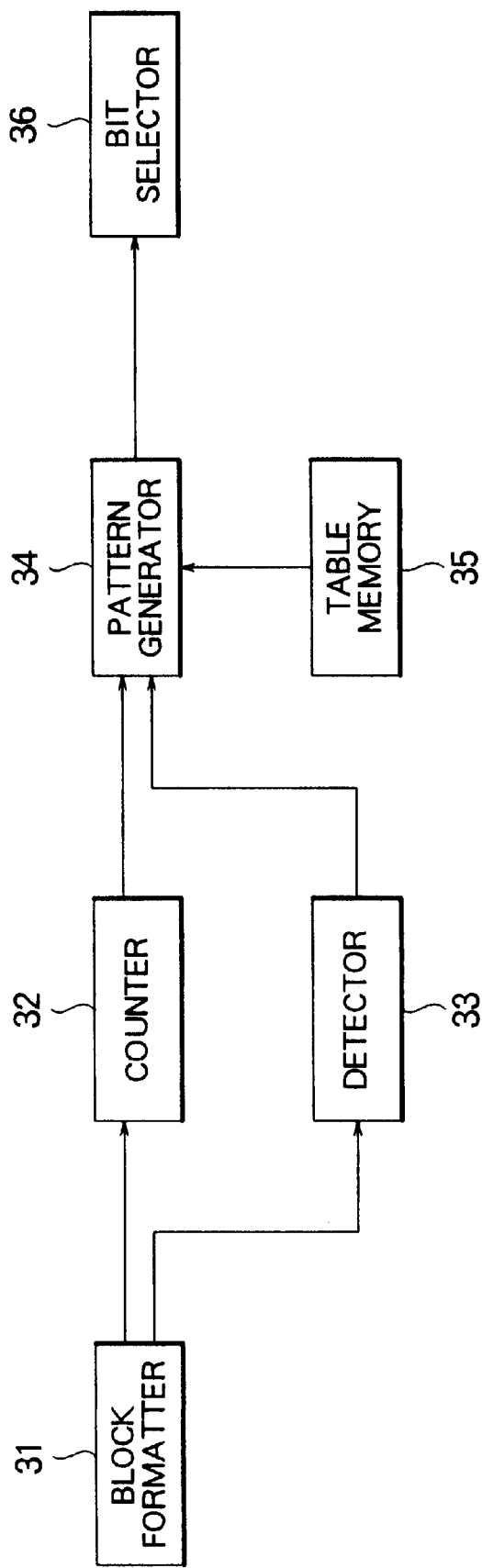
FIG. 6 is a block diagram of a data compression apparatus illustrating a third embodiment of the invention.

Referring to FIG. 6, the third embodiment comprises a block formatter 31, a counter 32, an adjacency detector 33, a pattern generator 34, a table memory 35, and a bit selector 36. The table memory 35 comprises a semiconductor memory device such as a read-only memory device, or part of such a device. The other elements of the third embodiment comprise logic circuits or the like, detailed descriptions of which will be omitted.

Next, the operation of the third embodiment will be described.

The block formatter 31 receives data representing a bi-level image and rearranges the received data into four-bit blocks, each block representing four picture elements or pixels disposed in a two-by-two square in the bi-level image. Referring to FIG. 7, there are sixteen possible arrangements of black and white pixels in each two-by-two square. These arrangements can be numbered as shown, from zero to fifteen, in order of increasing darkness. The sixteen arrangements can also be divided into seven groups as shown. For each two-by-two square, the block formatter 31 generates the four-bit block of data shown in FIG. 8, the numbers in the left-hand column in FIG. 8 corresponding to the numbers from zero to fifteen in FIG. 7.

The counter 32 in FIG. 6 counts the number of bits having a value of '1' in each block. The resulting count, which represents the number of black pixels in the corresponding two-by-two square, will be referred to as the weight of the block. Increasing weight thus represents increasing darkness in the bi-level image.

The adjacency detector 33 detects relationships among like-valued bits in each block, these relationships corresponding to adjacency relationships among like-colored pixels. Referring again to FIG. 7, for blocks of weight two, the output of the adjacency detector 33 indicates whether the block belongs to group three, in which like pixels are vertically adjacent, group four, in which like pixels are horizontally adjacent, or group five, in which like pixels are diagonally adjacent. For blocks of other weights, the output of the adjacency detector 33 indicates the presence of all three types of adjacency relationships (vertical, horizontal, and diagonal).

On the basis of the weight and adjacency information produced by the counter 32 and adjacency detector 33, the pattern generator 34 generates a bit pattern for each block. The first bit or most significant bit is generated by comparing the weight information with a threshold value of two, and indicates whether the weight is at least two.

$$\text{First bit} = 0 \text{ if weight} < 2$$
$$= 1 \text{ if weight} \geq 2$$

When the first bit indicates a weight less than two, the second bit is also generated from the weight information, and indicates whether the weight is one or zero.

$$\text{Second bit} = 0 \text{ if weight} = 0$$
$$= 1 \text{ if weight} = 1$$

When the first bit indicates a weight of at least two, the second bit is generated from the adjacency information, and indicates the presence or absence of diagonally adjacent black pixels.

Second bit = 0 if black pixels not diagonally adjacent
       = 1 otherwise

When the weight is at least two but the second bit indicates that there are no diagonally adjacent black pixels (implying that the weight is equal to two), the third bit indicates whether the black pixels are vertically or horizontally adjacent.

Third bit = 0 if black pixels are vertically adjacent
      = 1 if black pixels are horizontally adjacent When the weight is at least two and the second bit indicates the presence of diagonally adjacent black pixels, the third bit indicates whether the weight is greater than two.

Third bit = 0 if weight = 2
      = 1 if weight ≧ 3

In all, the pattern generator 34 generates two bits for blocks with weights of zero and one, and three bits for blocks with weights of two, three, and four. FIG. 9 shows the bit pattern generated for each of the sixteen data blocks.

The table memory 35 contains threshold values and other values used by the pattern generator 34 in generating bits as described above.

The bit selector 36 selects the bits generated by the pattern generator 34 according to the required compression ratio. For a 4:1 compression ratio, the bit selector 36 selects only the first bit generated for each block, i.e. the most significant bit, indicating whether the weight is at least two. For a 4:2 compression ratio, the bit selector 36 selects the first two bits. For a 4:3 compression ratio, the bit selector 36 selects all bits generated by the pattern generator 34. For blocks of weights less than two, for which the pattern generator 34 generates only two bits, the bit selector 36 may add a dummy bit if it is necessary for all blocks to have the same number of bits.

One way for the bit selector 36 to operate is to begin by selecting the first bit generated by the pattern generator 34 for each block. After all of these first bits have been output, the bit selector 36 next selects the second bit generated by the pattern generator 34 for each block. After all of the second bits have been output, the bit selector 36 selects the third bits, adding dummy bits as described above. The output of the bit selector 36 then consists of three independent bit planes.

When the third embodiment is used for data compression in the second embodiment, the bit selector 36 makes use of the three compressed data memories 17a, 17b, and 17c. For each block of bits, the bit selector 36 stores the first generated bit in compressed data memory 17a, the second generated bit in compressed data memory 17b, and the third generated bit or a dummy bit in compressed data memory 17c. Each compressed data memory thus stores one bit plane. The operation of the second embodiment is also altered slightly, as follows.

If the uncompressed bi-level image data cannot be encoded to fit within the available memory capacity, the selector 12 selects compressed data memories 17a, 17b, and 17c in turn and the lossless coder 13 encodes one bit plane at a time, starting with the first bit plane. The encoded data for the three bit planes are stored cumulatively in the encoded data memory 14; the memory checker 15 does not clear the encoded data memory between bit planes. At the end of each bit plane, the memory checker 15 compares the total amount of encoded data in the encoded data memory 14 with the available memory capacity of the receiving device. If the total amount of encoded data does not exceed the available memory capacity, the memory checker 15 has the encoded data memory 14 output the encoded bit plane to the interface unit 16. If the total amount of encoded data exceeds the available memory capacity, the memory checker 15 halts further encoding and does not have the encoded data memory 14 output the current bit plane to the interface unit 16, thereby discarding that bit plane and any subsequent bit planes.

The third embodiment can also be used in this way independently of the second embodiment. For example, the bit planes output by the third embodiment can be encoded and sent to the receiving device one after another until either all bit planes have been sent or the receiving device reports a memory overflow. When an overflow occurs, the receiving device discards the last (incompletely received) bit plane.

Next, a fourth embodiment will be described. The fourth embodiment is a method of expanding and printing compressed data of the type output by the third embodiment. The fourth embodiment is suitable for use with printing apparatus that has half the dot resolution of the original bi-level image in the horizontal direction. The fourth embodiment can be used, for example, when the original bi-level image has a resolution of one thousand two hundred dots per inch and the printing apparatus has a fixed horizontal resolution of six hundred dots per inch.

Figure 10:
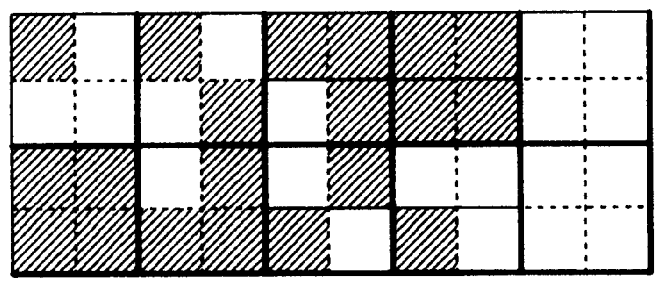
FIG. 10 illustrates part of a bi-level image divided into two-by-two blocks.

FIG. 10 illustrates part of a bi-level image divided into two-by-two squares for compression according to the third embodiment. It can be confirmed from FIG. 9 that the three bit planes generated from this part of the image have the following values, in which x indicates a dummy bit:

| First bit plane  | 0 | 1 | 1 | 1 | 0 |
|                  | 1 | 1 | 1 | 0 | 0 |
| Second bit plane | 1 | 1 | 1 | 1 | 0 |
|                  | 1 | 1 | 1 | 1 | 0 |
| Third bit plane  | x | 0 | 1 | 1 | x |
|                  | 1 | 1 | 0 | x | x |

Figure 11:
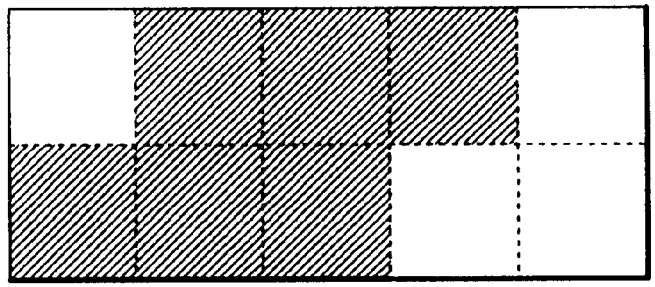
FIG. 11 illustrates the same image after compression and expansion with a 4:1 compression ratio according to a fourth embodiment of the invention.

When the receiving device has only enough memory capacity to receive the first bit plane, the received data are printed as shown in FIG. 11, with identical vertical and horizontal resolutions. Bits with values of '0' are printed as white dots, and bits with values of '1' as black dots.

Figure 12:
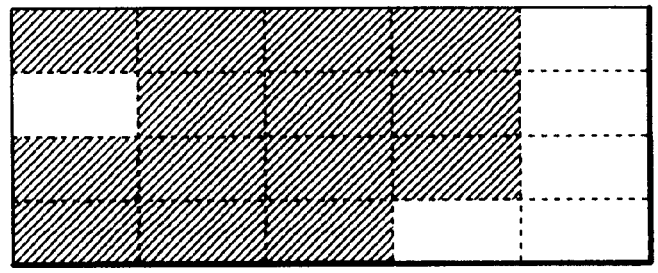
FIG. 12 illustrates the same image after compression and expansion with a 4:2 compression ratio according to the fourth embodiment.

When the receiving device has enough memory capacity to receive the first and second bit planes, the vertical resolution is doubled and the bit planes are interleaved as shown in FIG. 12. The first printed row of dots in FIG. 12 comes from the first row in the second bit plane (1 1 1 1 0). The second printed row of dots comes from the first row of the first bit plane (0 1 1 1 0). The third printed row of dots comes from the second row in the second bit plane (1 1 1 1 0). The fourth printed row of dots comes from the second row of the first bit plane (0 1 1 1 0).

Figure 13:
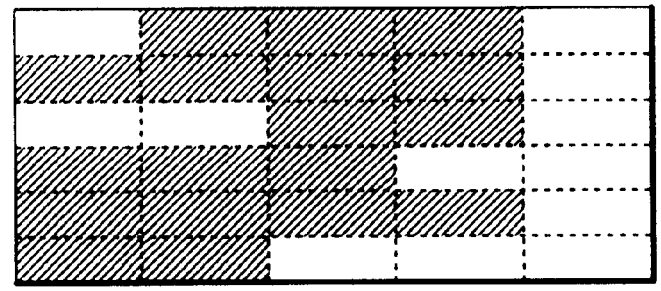
FIG. 13 illustrates the same image after compression and expansion with a 4:3 compression ratio according to the fourth embodiment.

When the receiving device has enough memory capacity to receive all three bit planes, the vertical resolution is tripled and the image is printed with the bit planes interleaved as shown in FIG. 13. The first three printed rows come from the first rows of the first, second, and third bit planes, printed in that order. The next three printed rows come from the second rows of the first, second, and third bit planes. Dummy bits are printed as white dots.

In many types of printers, the vertical resolution can be varied easily, by controlling the rate of transport of the printing medium, for example, while the horizontal resolution is not as readily variable. The fourth embodiment is well suited for use with this type of printer, because all printed dots pertaining the same block in the original bi-level image are aligned in the vertical direction, so that only the vertical resolution has to be varied according to the number of bit planes received. When the fourth embodiment is applied in the first embodiment, the data expanders 23a, 23b, and 23c operate by interleaving the bit planes and setting the vertical resolution of the printer to the appropriate value.

Next a fifth embodiment will be described. The fifth embodiment uses the configuration shown in FIG. 6 to generate four bit planes instead of three.

The first two bit planes are the same as in the third embodiment. Accordingly, the first bit plane indicates whether the weight of each block is at least two.

First bit = 0 if weight < 2
= 1 if weight ≧ 2

When the first bit indicates a weight less than two, the second bit indicates the weight.

Second bit = 0 if weight = 0
= 1 if weight = 1

When the first bit indicates a weight of at least two, the second bit indicates the presence or absence of diagonally adjacent black pixels.

Second bit = 0 if no diagonally adjacent black pixels
= 1 otherwise

Turning now to the third and fourth bit planes, when the weight is equal to zero, the third bit has a value of '0.'

When the weight is equal to one, the third bit indicates whether the black pixel is in the upper or lower row. This information is not provided by the adjacency detector 33, but can be obtained by applying the block data to a table in the table memory 35

Third bit = 0 if black pixel is in upper row
= 1 if black pixel is in lower row

When the weight is equal to two and the black pixels are not diagonally adjacent, the third bit indicates whether the black pixels are vertically or horizontally adjacent.

Third bit = 0 if black pixels are vertically adjacent
= 1 if black pixels are horizontally adjacent When the weight is at least two and there are diagonally adjacent black pixels, the third bit indicates whether the weight is greater than two, as follows:

Third bit = 0 if weight = 2
= 1 if weight ≧ 3

When the weight is equal to zero, the fourth bit has a value of '0.'

When the weight is equal to one, the fourth bit indicates whether the black pixel is in the left or right column.

Fourth bit = 0 if black pixel is in left column
= 1 if black pixel is in right column When the weight is equal to two and the black pixels are vertically adjacent, the fourth bit indicates whether the two black pixels are in the left or right column.

Fourth bit = 0 if black pixels are in left column
= 1 if black pixels are in right column When the weight is equal to two and the black pixels are horizontally adjacent, the fourth bit indicates whether the two black pixels are in the upper or lower row.

Fourth bit = 0 if black pixels are in upper row
= 1 if black pixels are in lower row When the weight is equal to two and the black pixels are diagonally adjacent, the fourth bit indicates the direction of the diagonal relationship.

Fourth bit = 0 if upper left and lower right
= 1 if lower left and upper right

When the third bit indicates a weight of at least three, the fourth bit identifies the weight.

Fourth bit = 0 if weight = 3
= 1 if weight = 4

FIG. 14 illustrates the bit patterns output by the fifth embodiment for all sixteen data blocks. The pattern generator 34 generates four bits for every block, so the bit selector 36 can output up to four complete bit planes.

When the bit selector 36 outputs all four bit planes, although the compression ratio if 4:4, the output bit patterns are not equivalent to the input bi-level image data. All blocks with a weight of three are output as the same '1 1 1 0' pattern, so the decoding and expanding apparatus cannot reproduce the original bi-level image exactly. The differences are not readily apparent to the eye in printed output, however, so for many purposes, the four bit planes output by the fifth embodiment can be used as a substitute for the original bi-level image data.

If the fifth embodiment is employed as the data compression unit 11 in the second embodiment, with four compressed data memories instead of three, then the selector 12 need not receive the original bi-level image data from the input-output unit 10. The four bit planes are encoded one after another and stored in the encoded data memory 14, stopping when the total size of the encoded data reaches or surpasses the memory capacity of the receiving device. The memory checker 15 never has to clear the encoded data memory 14 and start over.

Other aspects of the operation of the fifth embodiment are the same as in the third embodiment.

Next, a sixth embodiment will be described. The sixth embodiment also uses the configuration in FIG. 6 to generate four bit planes. In the sixth embodiment, the first two bit planes are determined by the weights of the blocks. The first or most significant bit is the same as before.

First bit = 0 if weight < 2
       = 1 if weight ≧ 2

When the first bit indicates a weight less than two, the second bit identifies the weight.

Second bit = 0 if weight = 0
        = 1 if weight = 1

When the first bit indicates a weight of at least two, the second bit indicates whether the weight exceeds two.

Second bit = 0 if weight = 2
        = 1 if weight ≧ 3

When the weight is equal to zero, the third bit has a value of '0.'

When the weight is equal to one, the third bit indicates the vertical position of the black pixel.

Third bit = 0 if black pixel is in upper row
       = 1 if black pixel is in lower row When the weight is equal to two, the third bit indicates whether the black pixels are diagonally adjacent.

Third bit = 0 if black pixels are diagonally adjacent
       = 1 otherwise

When the weight is equal to three, the third bit indicates the vertical position of the white pixel.

Third bit = 0 if white pixel is in upper row
       = 1 if white pixel is in lower row When the weight is equal to four, the third bit has a value of '1.'

Turning to the fourth bit, when the weight is equal to zero, the fourth bit has a value of '0.'

When the weight is equal to one, the fourth bit indicates the horizontal position of the black pixel.

Fourth bit = 0 if black pixel is in left column
        = 1 if black pixel is in right column When the weight is equal to two and the black pixels are not diagonally adjacent, the fourth bit indicates whether the black pixels are vertically or horizontally adjacent.

Fourth bit = 0 if black pixels are vertically adjacent
        = 1 if black pixels are horizontally adjacent When the weight is equal to two and the black pixels are diagonally adjacent, the fourth bit indicates the direction of the diagonal relationship.

Fourth bit = 0 if upper left and lower right
        = 1 if lower left and upper right When the weight is equal to three, the fourth bit indicates the horizontal position of the white pixel.

Fourth bit = 0 if white pixel is in left column
        = 1 if white pixel is in right column When the weight is equal to four, the fourth bit has a value of '1.'

FIG. 15 illustrates the bit patterns output by the sixth embodiment for all sixteen data blocks. Aside from the different bit patterns, the sixth embodiment operates like the fifth embodiment, so further description will be omitted.

Next a seventh embodiment will be described. The seventh embodiment is a data compression unit that generates four bit planes, generally similar to the bit planes generated in the sixth embodiment.

Figure 16:
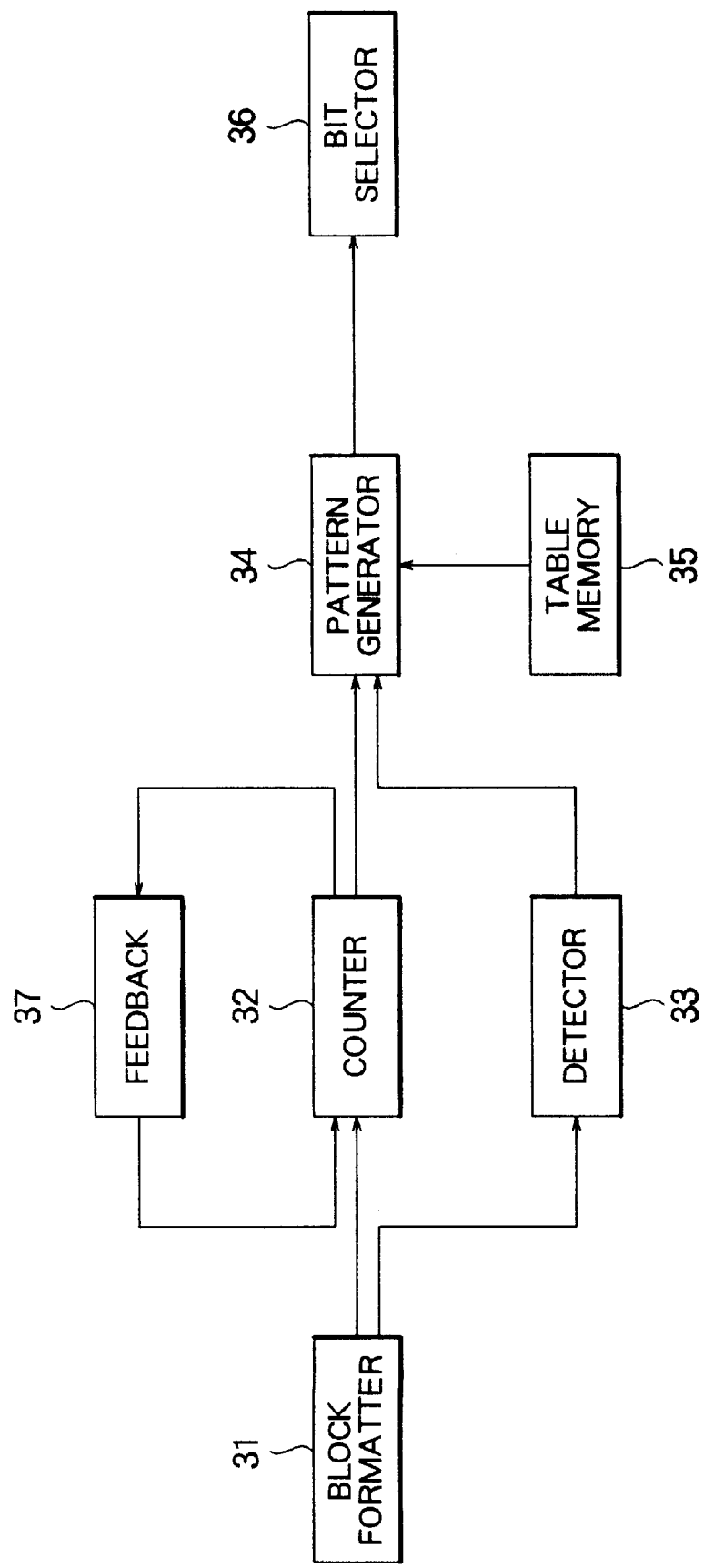
FIG. 16 is a block diagram of a data compression apparatus illustrating a seventh embodiment of the invention.

Referring to FIG. 16, the seventh embodiment has the same block formatter 31, counter 32, adjacency detector 33, pattern generator 34, table memory 35, and bit selector 36 as the sixth embodiment, and an additional feedback unit 37. The feedback unit 37 feeds the weight of each block calculated by the counter 32 back to the counter 32. The counter 32 uses the feedback to adjust the weight of the next block. If the next block has a weight of one and the feedback indicates a weight of two or more, the counter 32 increases the weight of the next block from one to two. In other cases, the counter 32 leaves the weight of the next block unchanged.

The output of the feedback unit 37 is, for example, a single bit which has a value of '1' to indicate a weight of at least two, and a value of '0' to indicate a weight less than two. Referring to FIG. 17, when the feedback value is '0,' the seventh embodiment generates the same bit patterns as in the sixth embodiment. When the feedback value is '1', however, different bit patterns are generated from blocks of data containing only one '1' bit, representing only one black pixel. Specifically, the first two output bits are changed from '0 1' to '1 0,' thus indicating a weight of two instead of the true weight of one.

Other aspects of the operation of the seventh embodiment are the same as in the sixth embodiment.

Figure 18:
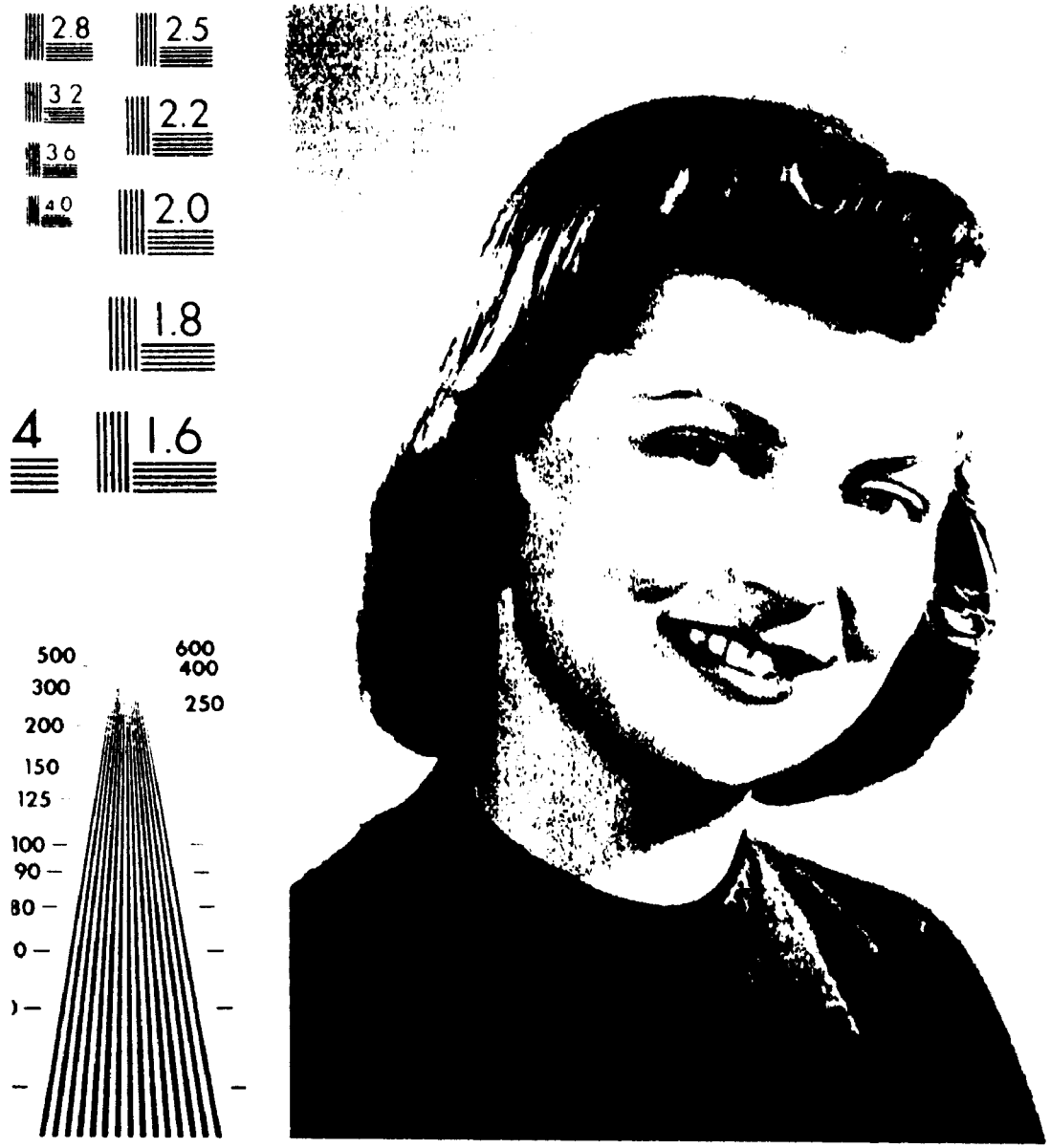
FIG. 18 illustrates a bi-level image.
Figure 19:
FIG. 19 illustrates the same image after compression and expansion with a 4:1 compression ratio according to the third, fifth, or sixth embodiment.
Figure 20:
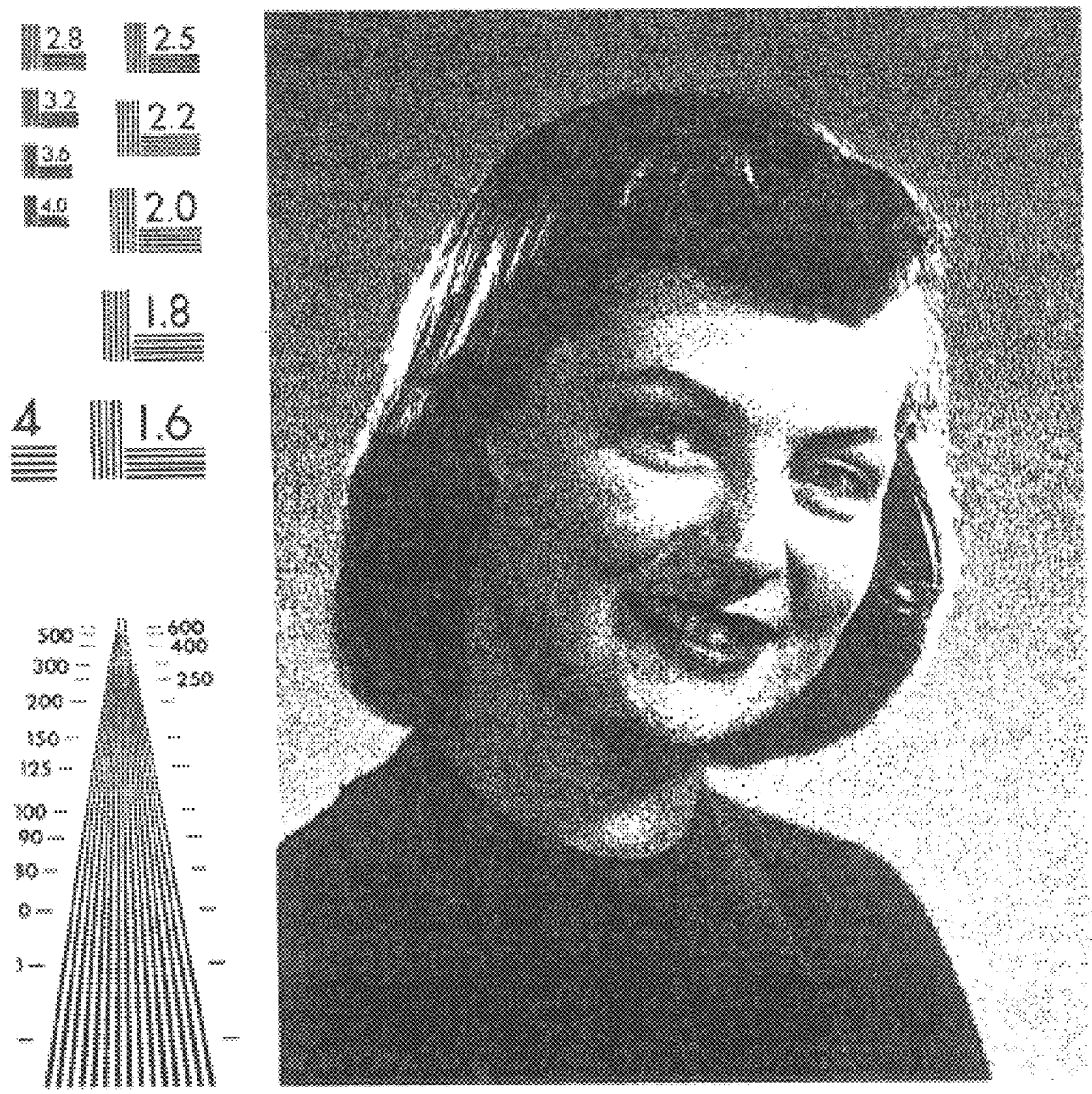
FIG. 20 illustrates the same image after compression and expansion with a 4:1 compression ratio according to the seventh embodiment.

FIGS. 18, 19, and 20 illustrate the effect of feedback in the seventh embodiment. FIG. 18 shows a bi-level image produced from natural image data with a dithering matrix. FIG. 19 shows the same image printed with 4:1 data compression, using only the first bit plane generated in the sixth embodiment. FIG. 20 shows the same image printed with similar 4:1 data compression, but using the first bit plane generated in the seventh embodiment.

A comparison of FIGS. 18 and 19 shows some loss of shading detail, due to the loss of isolated black dots. The image in FIG. 19 has a slightly harsh and washed-out appearance. In FIG. 20 the image as a whole is darker, because of the weight-increasing effect of the feedback, but shading is better reproduced and a softer and more pleasing overall tone is achieved.

Incidentally, the first bit planes in the third and fifth embodiments are identical to the first bit plane in the sixth embodiment, so the third and fifth embodiments would also produce the image shown in FIG. 19.

The third, fourth, fifth, sixth, and seventh embodiments have been described in relation to four-bit data blocks representing two-by-two-pixel image areas, but similar compression techniques can be applied to data blocks of other sizes, representing arbitrary rectangular image areas. The feedback concept of the seventh embodiment can be generalized by adjusting certain weights in the upward direction when the weight of the preceding block is above a certain value, and adjusting certain weights in the downward direction when the weight of the preceding block is below a certain value.

In the third, fifth, sixth, and seventh embodiments, the bit-generating rules can be hard-wired into the logic circuits of the pattern generator 34, enabling the pattern generator 34 to generate bits without referring to the table memory 35.

It is also possible for the table memory 35 to contain the full bit pattern table shown in FIGS. 9, 14, or 15, in which case the pattern generator 34 can generate bits directly from the blocks of data created by the block formatter 31, without the intermediation of the counter 32 and adjacency detector 33. In this case, the weight-counting and adjacency detection processes are built into the table information stored in the table memory 35. Since the counter 32 is eliminated, in the seventh embodiment, the feedback unit 37 provides feedback to the pattern generator 34 instead of to the counter 32, the feedback comprising the most significant bit generated by the pattern generator 34 for each block.

The seventh embodiment could be based on the third or fifth embodiment instead of the sixth embodiment.

Those skilled in the art will recognize that other modifications are possible within the scope of the invention as set forth in the claims below.

What is claimed is:

1. A method of compressing image data for transmission from a first device to a second device which is physically separate from but connected to the first device, the second device having a limited memory capacity, comprising the steps of:
   (a) querying said second device, thereby determining an available memory capacity of said second device;
   (b) encoding and storing said image data to obtain first encoded data;
   (c) comparing an amount of said first encoded data with said available memory capacity;
   (d) transmitting said first encoded data to said second device if the amount of said first encoded data does not exceed said available memory capacity;
   (e) compressing said image data with a certain compression ratio to obtain compressed data, if the amount of said first encoded data exceeds said available memory capacity;
   (f) encoding said compressed data to obtain second encoded data;
   (g) comparing the amount of said second encoded data with said available memory capacity;
   (h) transmitting said second encoded data to said second device if the amount of said second encoded data does not exceed said available memory capacity; and
   (i) repeating said steps (e), (f), (g), and (h), with successively increasing compression ratios in said step (e), if the amount of said second encoded data exceeds said available memory capacity, until the amount of second encoded data does not exceed said available memory capacity.

2. The method of claim 1, wherein said image data are bi-level image data, and said step (e) comprises the further steps of:
   (j) arranging said bi-level image data into blocks, each block being a two-by-two block with four data bits;
   (k) counting bits having a certain value, thereby determining a weight of each said block;
   (l) detecting horizontal, vertical, and diagonal adjacency relationships among like-valued bits in each said block;
   (m) generating, from each said block, at least one bit with a value responsive to the weight of said block; and
   (n) generating, from blocks having a certain weight, at least one subsequent bit having a value responsive to said adjacency relationships.

3. The method of claim 2, comprising the further step of:
   (o) adjusting the weight determined in said step (k) according to the weight of a preceding block.

4. The method of claim 2, wherein said step (i) comprises the further step of:
   (p) discarding bits generated in said step (e), thereby increasing said compression ratio.

5. The method of claim 4, wherein said step (p) always leaves undiscarded at least one bit having a value responsive to said weight.

6. The method of claim 2, wherein increasing weights indicate increasing darkness, and said step (m) generates, for each said block, a most significant bit indicating whether said block has at least a certain threshold weight.

7. The method of claim 6, comprising the further step of:
   (q) increasing the weight determined in said step (k) when the most significant bit generated in said step (m) from a preceding block indicates that said preceding block had at least said threshold weight.

8. A compression and encoding apparatus for preparing image data for transmission from a sending device to a receiving device which is physically separate from but connected to the sending device, the receiving device having a limited memory capacity, comprising:

a plurality of data compressors, for compressing said image data with different compression ratios, thereby generating compressed data;

a selector coupled to said data compressors, for selecting the compressed data generated by one of said data compressors, responsive to a control signal;

an encoder coupled to said selector, for encoding the compressed data selected by said selector, thereby generating encoded data;

an encoded data memory coupled to said coder, for storing said encoded data; and a memory checker coupled to said encoded data memory, for comparing the amount of said encoded data with an available memory capacity in said receiving device, and generating said control signal, thereby causing said selector to select compressed data that have been compressed with successively increasing compression ratios, until the amount of said encoded data does not exceed said available memory capacity.

9. The apparatus of claim 8, further comprising a plurality of compressed data memories coupled to respective data compressors, for storing the compressed data generated by said data compressors, and providing said compressed data to said selector.

10. The apparatus of claim 8, wherein said memory checker sends said control signal to said receiving device.

11. A data compressor for compressing bi-level image data, comprising:

a block formatter for arranging said bi-level image data into two-by-two blocks;

a counter coupled to said block formatter, for counting said bits having a certain value, thereby determining a weight of each said block;

an adjacency detector coupled to said block formatter, for detecting horizontal, vertical, and diagonal adjacency relationships among like-valued bits in the two-by-two image area represented by each said block;

a compressed pattern generator coupled to said counter, for generating, from each said block, at least one bit with a value responsive to the weight of said block, and for generating, from blocks having a certain weight, at least one subsequent bit having a value responsive to said adjacency relationships; and a bit selector coupled to said compressed pattern generator, for selecting, as compressed image data, at least one bit generated by said compressed pattern generator for each said block.

12. The data compressor of claim 11, wherein for each said block, said bit selector begins by selecting at least one most significant bit generated responsive to said weight.

13. The data compressor of claim 11, wherein said bit selector first selects one bit for every said block, then selects one more bit for every said block, then continues in like manner, selecting bits one at a time per block, until a desired number of bits per block have been selected.

14. The data compressor of claim 11, wherein increasing weights indicate increasing darkness, and said compressed pattern generator generates, for each said block, a most significant bit indicating whether said block has at least a certain threshold weight.

15. The data compressor of claim 14, wherein said threshold value is two.

16. The data compressor of claim 11, wherein said compressed pattern generator generates, for each block having a weight of at least two, two subsequent bits collectively having a first value if said weight is equal to two and said adjacency relationships are vertical, a second value if said weight is equal to two and said adjacency relationships are horizontal, a third value if said weight is equal to two and said adjacency relationships are diagonal, and a fourth value if said weight is greater than two.

17. The data compressor of claim 11, wherein said compressed pattern generator generates, for each said block, two bits responsive to said weight.

18. The data compressor of claim 17, wherein said compressed pattern generator generates, for each said block, two subsequent bits, said two subsequent bits being generated responsive to said adjacency relationships when said weight is two.

19. The data compressor of claim 11, also comprising a feedback unit coupled to said counter, for supplying said counter with a value responsive to the weight of each said block, for use by said counter in calculating the weight of a next block.

20. The data compressor of claim 19, wherein increasing weights represent increasing darkness, and the value supplied by said feedback unit indicates whether said weight is less than two.

21. The apparatus of claim 20, wherein said counter uses the value supplied by said feedback unit only when the weight of said next block is equal to one.

22. The apparatus of claim 21 wherein, when said value indicates a weight not less than two and the weight of said next block is equal to one, said counter increases the weight of said next block from one to two.

23. A compression and encoding apparatus for preparing bi-level image data for transmission from a sending device to a receiving device which is physically separate from but connected to the sending device, the receiving device having a limited memory capacity, comprising:

a data compressor, for compressing said bi-level image data with different compression ratios, responsive to a control signal, thereby generating compressed data;

an encoder coupled to said data compressor, for encoding said compressed data, thereby generating encoded data;

an encoded data memory in said sending device coupled to said encoder, for storing said encoded data; and a memory checker coupled to said encoded data memory, for comparing the amount of said encoded data with an available memory capacity in said receiving device, and generating said control signal, thereby causing said data compressor to generate compressed data that have been compressed with successively increasing compression ratios, until the amount of said encoded data does not exceed said available memory capacity; wherein said data compressor comprises:

a block formatter for arranging said bi-level image data into two-by-two blocks, each block representing a two-by-two image area;

a counter for counting bits having a certain value, thereby determining a weight of each said block;

an adjacency detector for detecting horizontal, vertical, and diagonal adjacency relationships among like-valued bits in the image area represented by each said block;

a compressed pattern generator for generating, from each said block at least one bit with a value responsive to the weight of said block, and for generating, from blocks having a certain weight, at least one subsequent bit having a value responsive to said adjacency relationships; and a bit selector for selecting, as compressed image data, at least one bit generated by said compressed pattern generator for each said block.

24. The apparatus of claim 23, wherein said compressed data comprise a number of bits varying from one bit to four bits per block, responsive to said control signal.

25. A decoding and expanding apparatus for decoding and expanding compressively coded image data, comprising:

an interface unit for receiving said compressively coded image data and receiving information specifying a compression ratio from a device physically separate from but connected to said decoding and expanding apparatus;

a receiving memory coupled to said interface unit, for storing said compressively coded image data;

a decoder coupled to said receiving memory, for decoding said compressively coded image data, thereby generating decoded data;

a plurality of data expanders coupled to said decoder, for expanding said decoded data with different expansion ratios, thereby generating expanded image data;

a selector coupled to said data expanders, for selecting the expanded image data generated by one of said data expanders, responsive to said compression ratio; and an output unit coupled to said selector, for outputting the expanded image data selected by said selector.

26. The decoding and expanding apparatus of claim 25, wherein said interface unit receives successive encoded bit planes.

27. The decoding and expanding apparatus of claim 26, wherein said data expanders expand said decoded data by interleaving said bit planes responsive to said information specifying a compression ratio.

28. The decoding and expanding apparatus of claim 27, wherein said data expanders assign different resolutions to said expanded image data in one direction, responsive to said information specifying a compression ratio, while leaving the resolution of said expanded image data constant in another direction.

* * * * *